(12) United States Patent
Czajka, II et al.

(10) Patent No.: US 10,171,985 B1
(45) Date of Patent: Jan. 1, 2019

(54) METHOD AND APPARATUS FOR DATA SHARING

(71) Applicant: Ginko LLC, West Bloomfield, MI (US)

(72) Inventors: Ronald J. Czajka, II, Brighton, MI (US); Sam B. Attisha, West Bloomfield, MI (US)

(73) Assignee: Ginko LLC, Brighton, MI (US)

( * ) Notice: Subject to any disclaimer, the term of this patent is extended or adjusted under 35 U.S.C. 154(b) by 195 days.

(21) Appl. No.: 15/217,424

(22) Filed: Jul. 22, 2016

Related U.S. Application Data

(60) Provisional application No. 62/234,246, filed on Sep. 29, 2015, provisional application No. 62/195,534, filed on Jul. 22, 2015.

(51) Int. Cl.

| | |
|---|---|
| *G06F 3/0488* | (2013.01) |
| *H04W 8/00* | (2009.01) |
| *H04W 4/02* | (2018.01) |
| *H04L 29/08* | (2006.01) |
| *H04W 4/12* | (2009.01) |
| *G06F 3/0482* | (2013.01) |
| *G06F 3/0484* | (2013.01) |
| *H04W 76/14* | (2018.01) |

(52) U.S. Cl.
CPC .......... *H04W 8/005* (2013.01); *G06F 3/0482* (2013.01); *G06F 3/0484* (2013.01); *G06F 3/04883* (2013.01); *H04L 67/306* (2013.01); *H04W 4/023* (2013.01); *H04W 4/12* (2013.01); *H04W 76/14* (2018.02)

(58) Field of Classification Search
CPC ..... G06F 3/0488; G06F 3/0484; G06F 3/0482
See application file for complete search history.

(56) References Cited

U.S. PATENT DOCUMENTS

| | | |
|---|---|---|
| 5,960,411 A | 9/1999 | Hartman et al. |
| 6,694,353 B2 | 2/2004 | Sommerer |
| 6,748,402 B1 | 6/2004 | Reeves et al. |
| 6,785,367 B2 | 8/2004 | Horvath et al. |
| 6,873,841 B1 | 3/2005 | Sagar |
| 6,909,910 B2 | 6/2005 | Pappalardo et al. |
| 7,194,419 B2 | 3/2007 | Robertson et al. |
| 7,606,725 B2 | 10/2009 | Robertson et al. |
| 7,634,509 B2 | 12/2009 | Onyon et al. |

(Continued)

OTHER PUBLICATIONS

"SQL Profiles: Technical Overview" (Oracle, May 2010), 5 pp.

*Primary Examiner* — Andrea C Leggett
(74) *Attorney, Agent, or Firm* — Young Basile Hanlon & MacFarlane, P.C.

(57) ABSTRACT

Data sharing between devices in a network is described. User data associated with a user device is identified, and a location of the user device is determined. A potential contact device located within a proximity range relative to the location of the user device is identified. Communications are sent between the user device and the potential contact device to initiate data sharing. In response to the communications, data is exchanged between the user device and the potential contact device by sending the user data to the potential contact device, and sending contact data associated with the potential contact device to the user device to modify contact information stored in association with the user device. The data sharing can also initiate a chat session and/or generate a display.

19 Claims, 14 Drawing Sheets

(56) References Cited

U.S. PATENT DOCUMENTS

| | | |
|---|---|---|
| 7,680,513 B2 | 3/2010 | Haitani et al. |
| 8,588,386 B2 | 11/2013 | Isaacson et al. |
| 9,037,645 B2 | 5/2015 | Czajka et al. |
| 2005/0032527 A1 | 2/2005 | Sheha et al. |
| 2005/0091316 A1 | 4/2005 | Ponce et al. |
| 2007/0061567 A1 | 3/2007 | Day et al. |
| 2009/0307281 A1 | 12/2009 | McCarthy et al. |
| 2010/0057481 A1* | 3/2010 | Fein ................ G06Q 30/02 705/1.1 |
| 2010/0088246 A1 | 4/2010 | Lim |
| 2010/0217614 A1 | 8/2010 | Brown et al. |
| 2012/0197967 A1 | 8/2012 | Sivavakeesar |
| 2014/0075075 A1* | 3/2014 | Morrill ............ G06F 1/1632 710/303 |

* cited by examiner

METHOD AND APPARATUS FOR DATA SHARING

CROSS-REFERENCE TO RELATED APPLICATIONS

This application claims the benefit of U.S. Provisional Application No. 62/195,534, filed on Jul. 22, 2015, and 62/234,246, filed on Sep. 29, 2015, which are incorporated herein by reference in their entirety.

TECHNICAL FIELD

The present disclosure relates to electronic sharing of user data, managing user data of a network, and locating user devices for data exchange.

BACKGROUND

Network management of user data, such as user profile and contact information, can include storage of user information, and storing updates of user information. Social media networks provide platforms for users to post user information for other users to view on user devices. There is a need for an improved network and user device interfacing with the network that enhances management and storage of user data for more efficient data sharing.

SUMMARY

Data sharing between devices in a network is described. User data associated with a user device is identified, and a location of the user device is determined. A potential contact device located within a proximity range relative to the location of the user device is identified. Communications are sent between the user device and the potential contact device to initiate data sharing. In response to the communications, data is exchanged between the user device and the potential contact device by sending the user data to the potential contact device, and sending contact data associated with the potential contact device to the user device to modify contact information stored in association with the user device. The data sharing can also initiate a chat session and/or generate a display.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Various aspects of this disclosure are now described with reference to the drawings. In the following description, numerous specific details are set forth in order to provide a thorough understanding of one or more aspects. It should be understood, however, that certain aspects of this disclosure may be practiced without these specific details, or with other methods, components, materials, etc. In other instances, well-known structures and devices are shown in block diagram form to facilitate describing one or more aspects.

The present disclosure presents methods and apparatuses for detecting the proximity of contacts relative to a user and sharing contact information between the user and one or more detected contacts. A user of the disclosed method and apparatus, including without limitation computer readable instructions executable by the processing unit of the electronic device present disclosure (collectively, the "application"; noting, however, that said term may also include further embodiments as may hereinafter be described or referenced), may receive contact and other information and data (collectively, "user data") from detected contacts (i.e., other users) and send their own user data thereto based in part on the types of information each user elects to share, the nature of the relationship between the users, and the conditions under which any user data may be shared. Generally, each user may receive user data from and transmit user data to other users, for example, by way of a server in communication with each user device, thereby resulting in a real-time exchange of user data, subject to any limitations as may be imposed by each user.

As used herein, the term "user" includes individuals and entities using the application, for example, at least based on the existence of an account profile belonging thereto. As used in the singular form, "user" may refer to a human user by example. As used in the plural form, "users" may refer to one or more potential contacts and/or registered contacts. Notwithstanding the foregoing, it will be apparent that "user" may include various other embodiments as may hereinafter be described or referenced.

Figure 1:
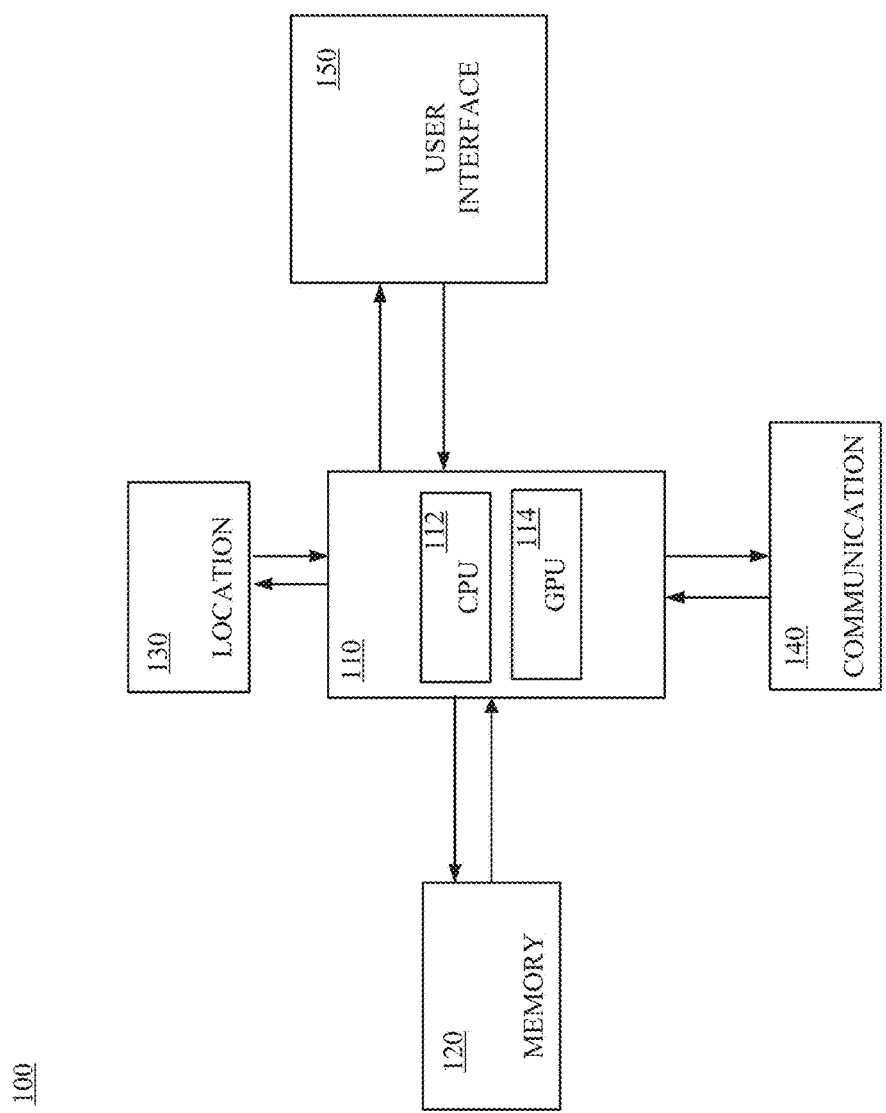
FIG. 1 is a diagram of an example of an apparatus for data sharing in accordance with implementations of this disclosure.

FIG. 1 is a diagram of an example of an apparatus for detecting contact proximity and sharing contact information in accordance with implementations of the present disclosure. A user device 100 for detecting contact proximity and sharing contact information may include a processing unit 110, a memory unit 120, a location component 130, a communication component 140, a user interface unit 150, or a combination thereof. The user device 100 may be an electronic device, which may be, without limitation, a smartphone, personal digital assistant, tablet computer, laptop computer, desktop computer or other Internet-connectable device.

The processor 110 may be one or more various computer processors used to process data and perform computing tasks including without limitation a central processing unit (CPU) 112, and/or a graphical processing unit (GPU) 114 as shown in FIG. 1. In some embodiments, the CPU 112 or GPU 114 may be implemented as a microcontroller, microprocessor, or an application specific integrated circuit (ASIC), or a combination thereof.

The storage memory 120 may be one or more various volatile and nonvolatile memory types including without limitation random access memory, read only memory, flash memory or other removable/non-removable storage media. The storage memory 120 may include a system memory module that may store executable computer instructions that, when executed by the processor 110, perform various user device functionalities including those described herein. The storage memory 120 may store data, including user account information or contact information, entered by the user via user interface unit 150 or received from the communication component 140.

The location component 130 may include, for example, a global positioning system module or geolocation module, which, based on its configuration, may be in communication with satellite or other external systems for tracking the location of an electronic device. In some embodiments, the positioning data received by the location component 130 may be one or more of a set of coordinates and a common address (e.g., a street address along with corresponding city, state/province/country information). The location component 130 may identify a location of the user device 100 using positioning data. The communication component 140 may send and receive electronic data including, for example, user data. The user interface unit 150 may maintain the user's account profile and user data and the user data of other users, as well as receiving user commands to be processed.

The communication component 140 may include, for example, a modem or other hardware module or adapter for connecting the electronic device to a network, such as an intranet, local network, or the Internet, either through a physical connection (e.g., Ethernet) or wireless connection (e.g., Wi-Fi). In some embodiments, the communication component may connect the user device to, and thereafter communicate with, a server and/or one or more other user devices.

The user interface unit 150 may include one or more units that may register or receive input from a user or present outputs to the user, such as a display, touch interface, a proximity sensitive interface, a light receiving/emitting unit, sound receiving/emitting unit, a wired/wireless unit, or other units. In some embodiments, the user interface unit 150 may include a display, one or more tactile elements (e.g., buttons or virtual touch screen buttons), lights (e.g., LED), speakers, or other user interface elements. The user interface unit 150 may receive user input and provide information to a user related to operation of the user device 100. The interface unit 150 may include, for example, part of a software application installed on and executed by the processor 110 and configured to receive and store user data, contact data and other information stored in the memory 120.

In some embodiments, the user interface unit 150 may include a display screen, such as a touch screen, for displaying content and receiving user commands to be processed. The user interface unit 150 may be supported by one or more input configurations including without limitation a keyboard and/or mouse configuration, a touchscreen configuration, and a microphone and speaker configuration. In some embodiments, the user interface unit 150 g may include user-selected customization features for creating and maintaining user data in an account profile. For example, the user interface unit 150 may include graphical features to enable the user to establish settings data, which may include various settings for modifying or limiting certain aspects of the software application.

The user data, the contact data, the settings data, or a combination thereof, may be stored within the storage memory 120 of the user device 100, within non-transient memory contained within the server, or a combination of both. For example, data associated with the user account profile may be input using the user interface unit 150, which may be immediately stored in storage memory 120 of the user device 100, and may be transmitted via the communication component 140 to a network server for storage in the network database within the server memory. The user data, contact data, and settings data may be communicated to the server periodically or in response to data changes, for example, to update contact data registered with various users or record select user preferences.

The account profile of the user may include user data of the user, which is viewable at least in part by certain other users. For example, "registered contacts" referred herein as network users with whom user data is being shared with the user, may view user data of the user. In some embodiments, the account profile may comprise various graphical features. For example, a picture (which may include without limitation a photograph, a computer generated image, a solid color, or a patterned image) may be uploaded to use as the background for the user account profile, or a picture may be retrieved from a library provided by the application or server. In some embodiments, the various media files, such as video, audio and picture files, may be uploaded to the account profile and made available for viewing by other users. For example, an entity user may upload commercials or other marketing materials to the account profile to promote goods and services to potential customers.

The user data may include information relative to an account profile of a user and may comprise name, title, company, availability status, account picture, phone and mobile numbers, mailing addresses, email addresses, facsimile numbers, social media links, websites, birthday, anniversary, and/or other information associated with the user. The user data may be received from a user interface. In some embodiments, user data may further include present and past location data for the user. The user data may be organized into one or more profiles (e.g., a work profile comprising the user's business contact information and a home profile comprising personal contact information), to permit the user to conveniently elect for only certain profiles to be publicly viewable, and/or to distinguish professional and personal user data for presentation to other users.

The contact data may include user data relative to registered contacts, which may be viewable by the user, for example, as a contact list accessible within the application. In some embodiments, the registration of further contact data or modification of existing contact data for a registered contact may be automatic according to user-based configuration by the user. In some embodiments, the registration of further contact data or modification of existing contact data for a registered contact may be received from a user interface in response to user entry. As an example of automatic modification, a registered contact of the user may elect to no longer share certain contact data with the user, permissions for the contact data relative to the user may be changed by the registered contact, thereby causing that contact data to no longer be viewable by the user. The contact data may be organized into one or more profiles as set by the corresponding user.

The settings data may include settings configured by the user device in accordance with selections by the user. In some embodiments, the settings data may be input to the user device via a user interface, such as the user interface unit 150 of FIG. 1. For example, an application may be executed to graphically display various configurable settings on a touch screen, and in response to user input, record and save the settings data to a memory of the user device, such as the memory 120. The settings data may be sent to a network server and stored in a memory unit of the network server as parameters when executing data sharing and detection of potential contacts in accordance with this disclosure. In some embodiments, the settings data may include a proximity range setting, a detection preferences setting, a user data setting, or a combination thereof.

The proximity range setting may indicate a particular proximity range relative to the user device location, within which searching and detecting of other users may be executed, such as searching and detecting potential contacts for the user within a two mile radius of the user's present location. In some embodiments, a network server may receive the proximity range setting from the user device, and may identify other users concurrently located within proximity of the user corresponding to the proximity range setting. In some embodiments, the user device may include a location detection function that uses peer-to-peer signals with a user device of another user located within a proximity of the user as defined by the proximity range setting. The proximity range setting may be fixed and unchangeable, or may be adjustable by the user.

The detection preferences setting may be defined by the user and may identify other users individually or a classification of users as potential contacts to be detected within the proximity range. For example, the detection preferences setting may be set to allow all users to be detected, or it may instead allow only certain selected users (e.g., entities that are restaurants, users identified by a first name, age, or gender, or other criteria) to be detected.

The user data setting may indicate the degree to which the user data (or specific portions thereof) is viewable by other users. In some embodiments, the user may define all or select portions of the user data as being public user data (i.e., automatically viewable by other users) or private user data (i.e., only viewable by other users upon the user granting permission therefor). The user may modify the user data setting from an initial setting. For example, the user data setting for a portion of the user data may be changed from public user data to private user data, and vice versa.

Based on the settings data, the server may detect other users located within the defined proximity range. Users who have not previously shared user data with the user, as well as users who have, but who no longer are sharing user data with the user, may be defined as "potential contacts." Users who are currently sharing user data with the user may be defined as "registered contacts." In some embodiments, upon detecting a potential contact, the user may send an exchange request to the potential contact by electing to share all user data, some user data, or no user data with the potential contact, provided that user data defined as public may automatically be shared upon initiating the exchange request. Upon the potential contact and the user each agreeing to share user data with one another, the user and the potential contact each become registered contacts to one another, and user data of the potential contact may be shared with the user as contact data and vice versa. In some embodiments, the user and a potential contact or registered contact may elect to enter into a private chat wherein they may communicate messages to each other.

Figure 2:
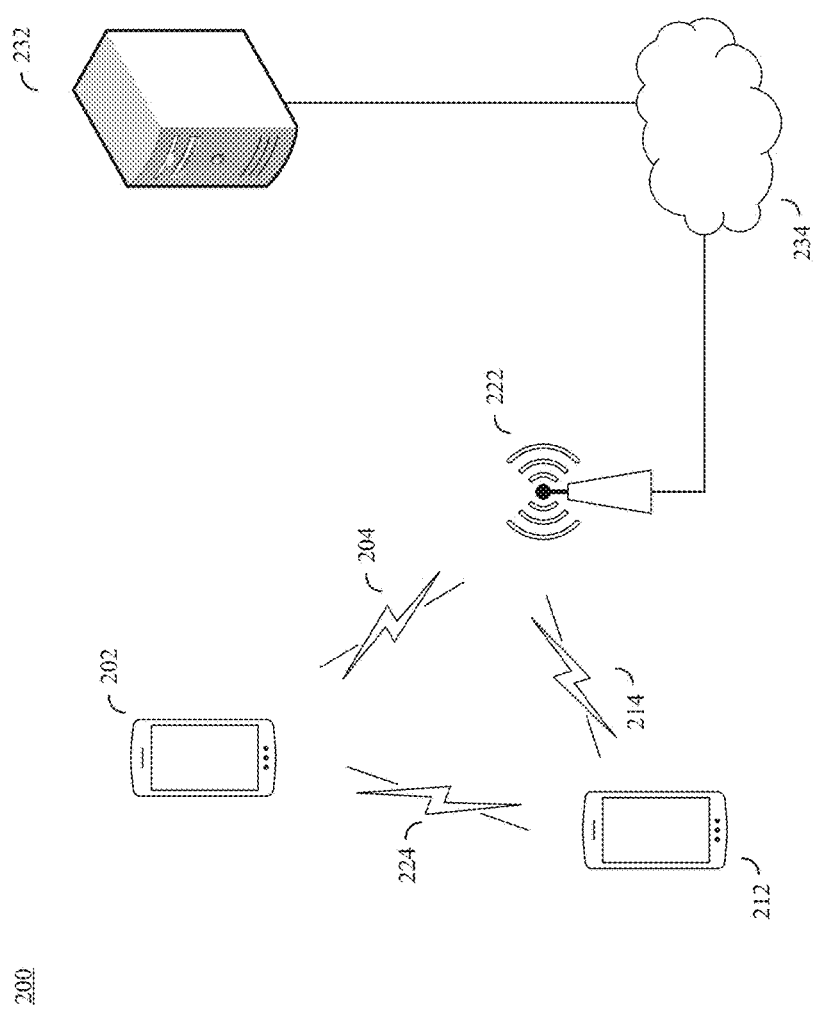
FIG. 2 is a diagram of an example of a system for data sharing between devices based on relative proximity in accordance with implementations of this disclosure.

FIG. 2 is a diagram of an example of a system for data sharing between devices based on relative proximity in accordance with implementations of the present disclosure. In some embodiments, a system 200 may include a user device 202, which may be configured as shown and described herein with reference to user device 100 in FIG. 1. The system 200 may also include one or more other user devices 212, a network access point 222, and a network server 232. The system 200 may also include communication links 204/214/224 and network 234.

The user device 202 may communicate with the network entities via communication link 204, and may access the network server 232 via a network or internet connection 234. The one or more other user devices 212 may be located within the proximity range as defined by the proximity range setting. In some embodiments, the user device 202 may communicate with the network server 232 to set up the account profile of the user and to upload the settings data onto the network server 232. The network server may detect the one or more user devices 212 as being associated with potential contacts for the user of user device 202 in response to an action by the user. For example, the user may open or start an application on the user device 202, which may automatically send a signal on communication link 204 to the access point 222 and forwarded to the network server 232 over the internet or network 234. The signal may include the location data and/or the settings data of the user device 202. Meanwhile, one or more other users registered with the network on associated user devices 212 may have communicated respective location data to the network server on communication link 214 via the access point 222 and the network 234. Based on the location data and/or settings data received from the user devices 202/212, the network server 232 may identify one or more user devices 212 as being located within the proximity range as set by the user device 202, and as such, are identified as potential contacts for the user of user device 202. In some embodiments, the user devices 202/212 may exchange location data directly, such as through a peer-to-peer communication link 224, which may then be transmitted to the network server 232.

In some embodiments, the user device 202 may receive an indication from the network server 232 of user devices 212 associated with potential contacts, as identified by the network server 232. The user device 202 may display the potential contacts on a user interface, from which a potential contact may be selected for exchanging user data such as contact information. The user device 202 may send the potential contact selection to the network server via the communication link 204. In response to the potential contact selection, the network server 232 may send a request to the user device 212 of the potential contact for exchanging contact information with the user of user device 202. If the potential contact agrees to exchange data with the user of user device 202, the data sharing may be transmitted via the network over communication links 204/214, or the data sharing may be transmitted directly via link 224. In some embodiments, the user and the new contact may commence a chat session via the network over communication links 204/214, or the chat session may be transmitted directly via peer-to-peer link 224. For example, a user sharing application may be activated on both the user device 202 and the device 212 of the new contact, which enables a chat session to be initiated by either the user or the new contact.

Figure 3:
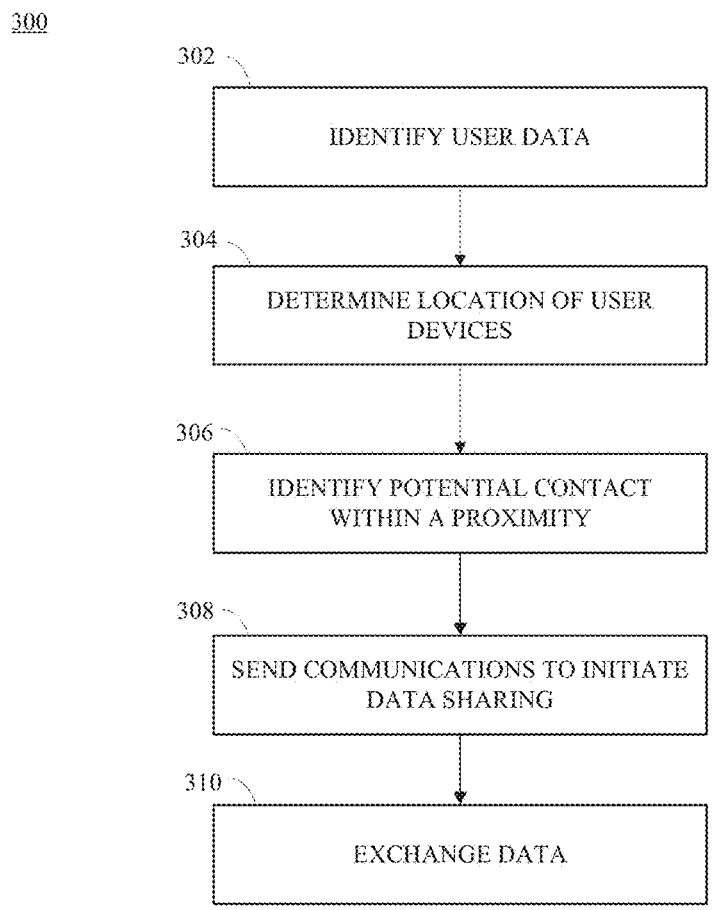
FIG. 3 is a flowchart diagram of an example of a method for data sharing between devices of FIG. 2 based on relative proximity in accordance with the implementations of this disclosure.

FIG. 3 is a flowchart diagram of an example of a method for data sharing between devices of FIG. 2 based on relative proximity in accordance with the implementations of the present disclosure. The method 300 may include identifying user data of a user at 302, determining a location of the user at 304, identifying a user device of a potential contact located within a defined proximity of the location of the user at 306, sending communications to initiate data sharing at 308, exchanging the data between the user the potential contact at 310, or a combination thereof.

In some embodiments, the method 300 may be implemented as a computer readable medium that stores instructions executable by processor. In some embodiments, the instructions may be stored in a memory, such as a memory in the network server 232 of FIG. 2, and may be executed by one or more processors in the network server 232. In some embodiments, the method 300 may be executed by the network server 232 to enable data sharing between user devices, such as the user device 202 and the one or more other user devices 212.

In some embodiments, the user data for registered users may be identified by the network at 302. For example, the user profile of each user includes the contact information of the user, which is recorded during registration and stored by the network server 232. Any updates to the contact information may be based on user input at the user device, and may be recorded and stored by the network server 232.

In some embodiments, the location of the user device 202 may be determined at 304. As detection of potential contacts is dependent upon location data of the user, the network server 232 regularly identifies the location of the user device 202 based on location data determined by the location component and transmitted by the communication component of the user device, such as location component 130 and communication component 140 of FIG. 1. In some embodiments, the communication of location data to the server may be dependent upon the location component 130 being enabled (e.g., wherein the electronic device is a smartphone, the GPS feature must be enabled in order for the user's location data to be communicated).

In some embodiments, a potential contact located within the selected proximity range may be identified at 306. The network server 232 may maintain records of location data for all user devices in communication with the network server 232. The location of other user devices 212 may be computed, for example, by calculating the distance between the user device 202 and other user devices 212. In the event other user devices 212 are determined to be within the proximity range defined by the settings data, subject to any detection preferences defined by the user, such other user devices 212 may be detected by the network server 232 based on the location data. In some embodiments, the network server 232 may notify the user that potential contacts are nearby. For example, the user device 202 may receive the notification of potential contacts, and execute a visual display for identifying the locations of potential contacts, such as by visually denoting the locations on a map. The user may then select one or more detected users to share user data with, subject to each user's user data settings.

In some embodiments, the network server may generate and send messages between the user and the potential contact related to data sharing at 308. For example, in response to the user's selection of a potential contact, a request message may be sent from the user device 202 indicating a request for an invitation message to be sent to the potential contact. The request message may include a permission setting indicating which user data and/or which user data profile of the user is selected to be shared with the potential contact. Responsive to receiving the request message, the network server 232 may generate and deliver the invitation message to the device 212 of the potential contact. A response message may be sent from the device 212 of the potential contact indicating acceptance or denial of the invitation. Responsive to receiving the response message, the network server 232 may generate and deliver a response message to the user device 202.

In some embodiments, the user device 202 may send the exchange request (e.g., via an electronic message) to the potential contact, via the network server 232, which the potential contact may accept, for example, by similarly selecting to share user data or entering into a chat conversation with the user. The potential contact may decline the exchange request, for example, by refusing to share any user data or refusing to enter into the chat conversation.

In some embodiments, the user device 202 may exchange data with the device 212 of the selected potential contact at 310. The user and potential contact may each select which user data is to be shared. For example, the data exchange may be limited based on permission settings elected by the user and/or the potential contact. In response to the network server 232 receiving a message from the device 212 of the potential contact identifying the potential contact's user data selected to be shared with the user, such as according to a permission setting, the network server 232 may send the an acceptance response message to the user device 202. The network server 232 may designate the user and the potential contact as registered contacts to each other, and the user data selected to be shared by the user and the potential contact may be registered as contact data respectively. The network server 232 may execute the data sharing by sending user data of the user, such as contact information, to the device 212 of the registered contact, and by sending user data of the potential contact, such as contact information, to the user device 202.

Figure 4:
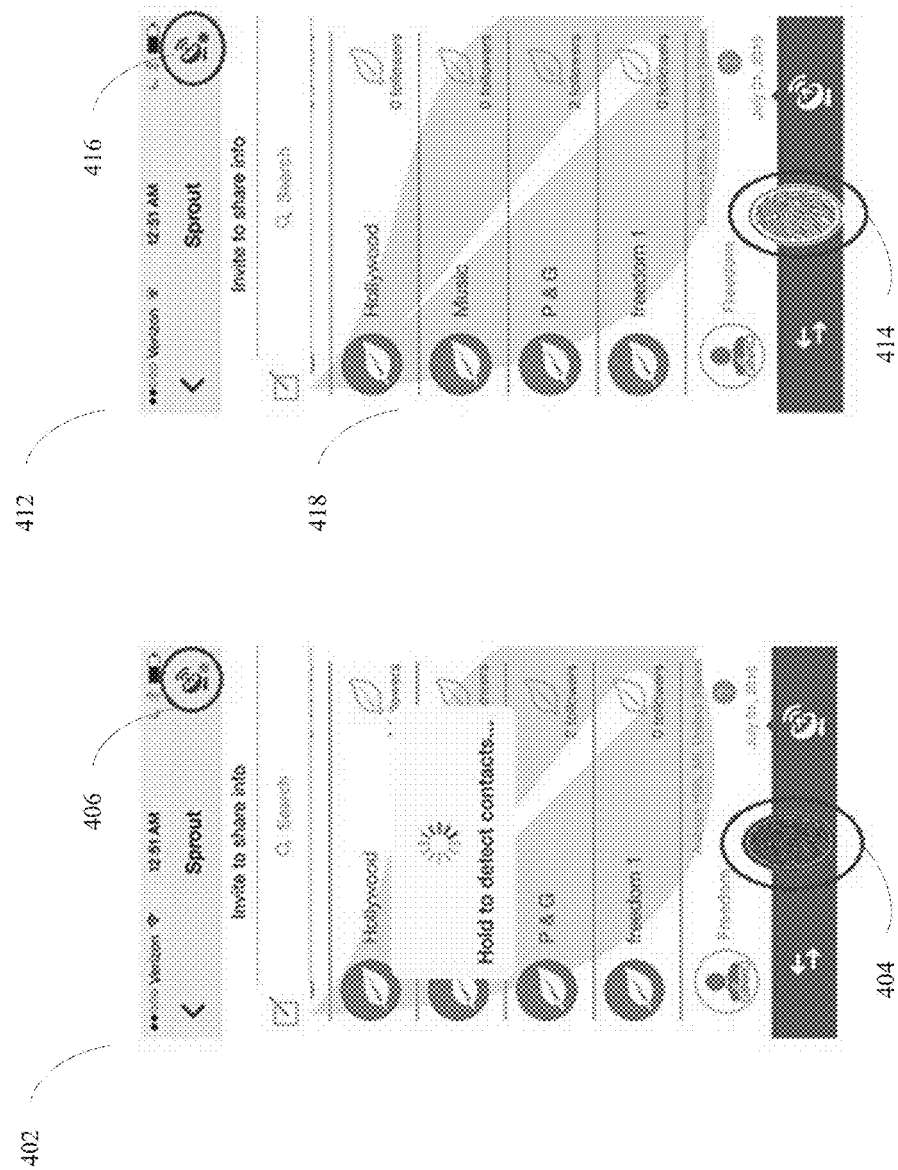
FIG. 4 is a diagram of an example of a user interface for in accordance with implementations of this disclosure.

FIG. 4 is a diagram of an example of a user interface display for detecting contacts responsive to user input in accordance with implementations of this disclosure. In some embodiments, the user device 202 may display an application interface display 402 for initiating a detection of contacts, and after an elapsed time duration of the detection, an application interface display 412 for indicating the results of the detection of contacts may be displayed. For example, the application interface display 402 may include a detection start icon 404 to enable the user to commence a request for detection of potential contacts in the vicinity of the user device, and a detection icon 406 that may provide an indication of status for the detection being processed by the network server. For example, the user device may respond to the user touch and/or holding the touch of the detection start icon 404 by sending location information of the user device to the network server. In some embodiments, the location component 130 of FIG. 1 may remain active for as long as the activation feature is manually toggled by the user touch of detection start icon 404. In some embodiments, the detection start icon 404 may respond only to a unique identifier, such as the user's fingerprint. The application interface display 402 may provide visual feedback that may include, for example, a color change or blinking of detection icon 406 to indicate status of the detection, which may include that the detection is in progress. The application interface display 412 may include a detection icon 416 for detection status indication, such as indicating that the detection processing is completed by changing the appearance of the detection icon 416 from detection icon 406 and/or a change in appearance of detection start icon 414 compared to detection start icon 404. Contact display region 418 may indicate the results of the detection process by identifying user identification or tags of potential contacts found to be within the proximity range defined in the proximity range setting.

Figure 5:
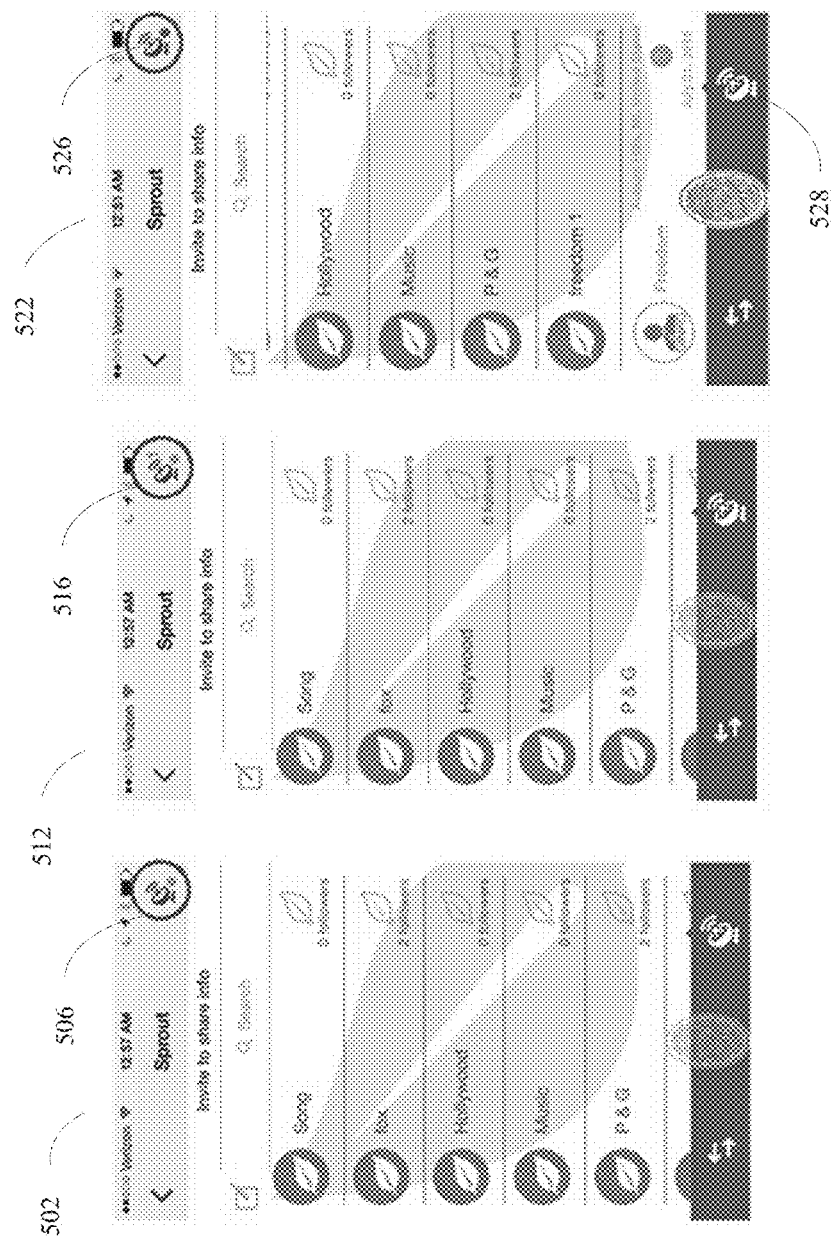
FIG. 5 is a diagram of an example of a user interface display for detecting contacts automatically in accordance with implementations of this disclosure.

FIG. 5 is a diagram of an example of a user interface display for detecting contacts automatically in accordance with implementations of this disclosure. In some embodiments, the user device 202 may display an application interface display 502 for an automatic detection mode, an application interface display 512 for indicating a status change for detection of potential contacts, and an application interface display 522 that indicates that automatic detection mode has been toggled off. For example, the application interface display 502 may include a detection icon 506 that may indicate an automatic detection mode for detecting potential contacts in the vicinity of the user device, such as by a visual indication that may include an icon color. The application interface display 512 may include a detection icon 516 that may indicate a new potential contact has been automatically detected, such as by a visual indication that may include a numeral corresponding to a number of new potential contacts detected. The application interface display 522 may include a detection mode icon 528 that enables a user to toggle between automatic detection mode and user initiated detection mode, and a detection icon 526 that may indicate the status change for the automatic detection mode, such as by a change in icon color.

In some embodiments, the user activated contact detection of FIG. 4 may enable a single one-time detection search by the network server, which may conserve resources of the user device and the network. In some embodiments, automatic contact detection of FIG. 5 may enable contact detection continuously while the automatic mode is activated. For example, automatic contact detection mode may be activated by toggling one or more activation features, that may include activating the location component 130 of FIG. 1 for an unspecified period of time (e.g., until the user subsequently deactivates the location component 130), and activating the location component 130 for a specified period of time (e.g., one hour). For example, tapping the detection icon 506 once may trigger contact detection activation for an unspecified period of time, tapping the detection icon 506 twice may trigger contact detection activation for a specified period of time, and tapping the detection icon 506 three times may deactivate the location component 130 and the contact detection process. The activation features for contact detection described herein are provided as examples, and other ways of user activation and automatic activation are possible for implementations of this disclosure.

Figure 6:
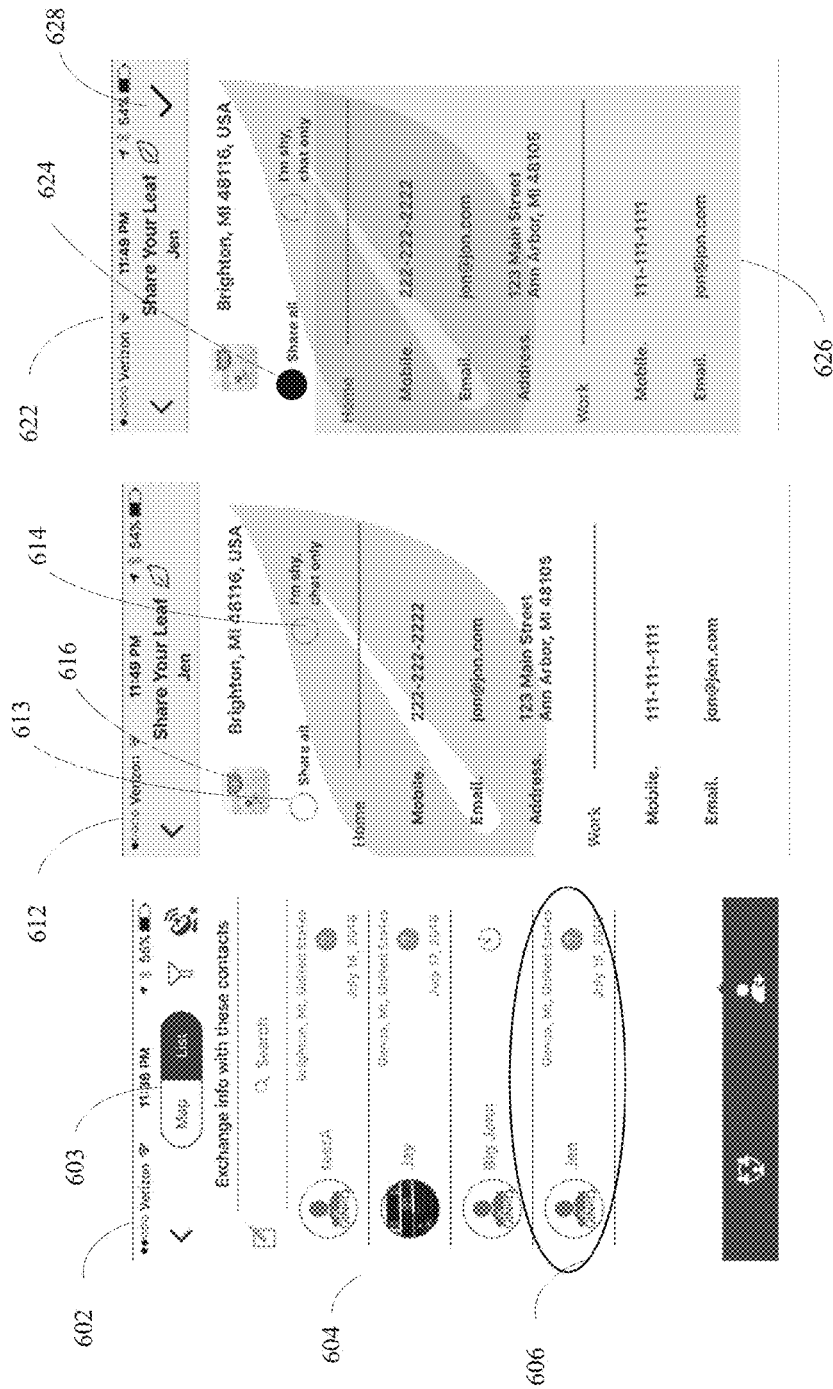
FIG. 6 is a diagram of an example of a user interface display for selecting user data for data sharing in accordance with implementations of this disclosure.

FIG. 6 is a diagram of an example of user interface display for selecting user data for data sharing in accordance with implementations of this disclosure. In some embodiments, application interface displays 602/612/622 may display information related to data sharing between the user and a potential contact identified by the contact detection of FIGS. 4 and 5. For example, the application interface display 602 may show registered contact identifications 604 and potential contact identifications 606 that may be distinguishable by having a different visual appearance or graphical representation. In some embodiments, the registered contact identifications 604 and potential contact identifications 606 may be displayed in a list format, as shown, in response to a user input at format icon 603 selecting a list format, such as by a touch screen tapping. The registered contact identifications 604 and potential contact identifications 606 may be arranged in the application interface display 602 in various ways, including alphabetically, by proximity to the user, time of detection, or based on frequency of previous exchanges. A data exchange with a potential contact may be initiated by the user device 202 in response to receiving user input, such as by tapping the potential contact identification 606 associated with the potential contact. The user device 202 may send a request signal to the network server 232 identifying the selected potential contact and indicating the user's request for sending an invitation for data exchange from the user device 202 to the device 212 of the potential contact.

In some embodiments, the application interface display 612 may be displayed in response to the request to exchange data, and may include selectable user data of the user, from which the user may select which user data of one or more user profiles to share with the potential contact. For example, the application interface display 612 may provide options for the user to share all data via icon 613, selectively share only certain user data (e.g., only certain profiles or portions thereof), or share no user data and instead request to enter into a chat conversation with the potential contact, by selection of chat only icon 614 for example.

In some embodiments, location region 616 of the application interface display 612 may indicate a location for the user device when the user device associated with potential contact identification 606 was detected by the network and identified to the user device 202.

In some embodiments, the application interface display 622 may indicate the user selection for user data for the data exchange. For example, a share all icon 624 may be responsive to user input, such as by touch screen tapping the icon 624, and all user data of the display may be visually altered for feedback display, such as shown by a highlighted region 626, to indicate confirmation by the user device 202 for the user selection. In some embodiments, the application interface display 622 may provide an interface for the user to accept the selected data sharing information, such as by touch screen tapping the accept icon 628. In response to the user input at the accept icon 628, the user device 202 may execute a data sharing request to the network server 232.

In some embodiments, the user device 202 may provide global user data changes by the user. For example, an application interface display may be presented to the user on the user interface unit 150 which shows the user data for all user profiles of the user as recorded on the network server 232. The user data profiles may be edited at any time by the user, allowing all registered contacts to have access to current user data once the user data is edited by the user and saved to the network server 232. Unlike with one-off transmissions of contact information, or exchanging of business cards, the user need not redistribute updated contact information since the update may be global via the central repository in the network server 232.

Figure 7:
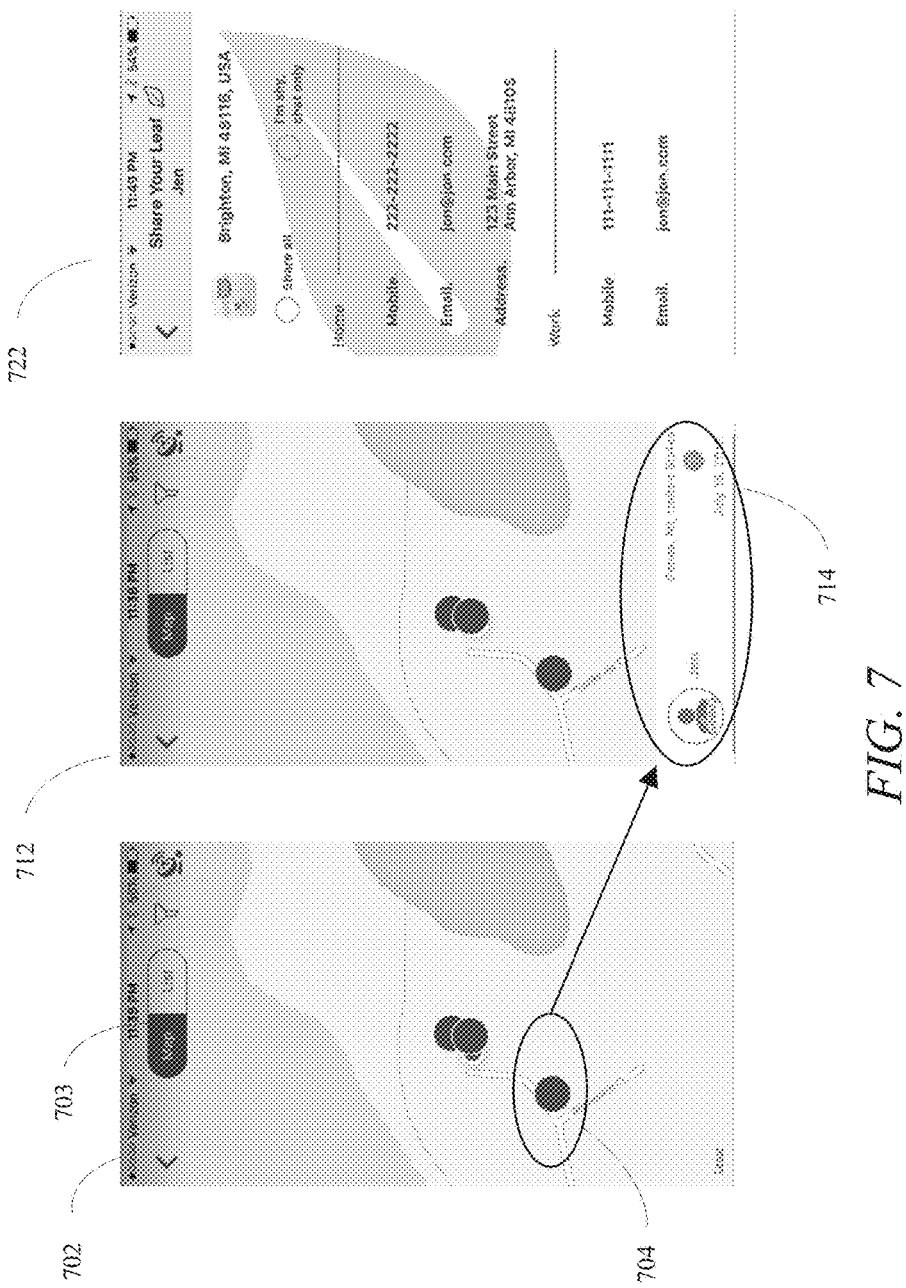
FIG. 7 is a diagram of an example of a user interface display for identifying a potential contact based on location in accordance with implementations of this disclosure.

FIG. 7 is a diagram of an example of a user interface display for identifying a potential contact based on location in accordance with implementations of this disclosure. In some embodiments, an application interface display 702 may display location information related to potential contacts, such as on a map, in response to user input at format icon 703, which may provide a selectable display for potential contacts in a map format or list format. For example, in response to user input selecting map format at format icon 703, such as by a touch screen tapping, the application interface display 702 may show markers 704 representing potential contacts in respective map locations. In some embodiments, a user input selection of a marker 704 may trigger a generation of an application interface display 712 which may show an identifier region 714 for the potential contact associated with the selected marker 704. In response to a user input, such as by touch screen tapping at the identifier region 714, an application interface display 722 may be generated for presenting selectable user data for sharing with the selected potential contact. The user may interface with the application interface display 722 as shown and described herein with respect to FIG. 6.

Figure 8:
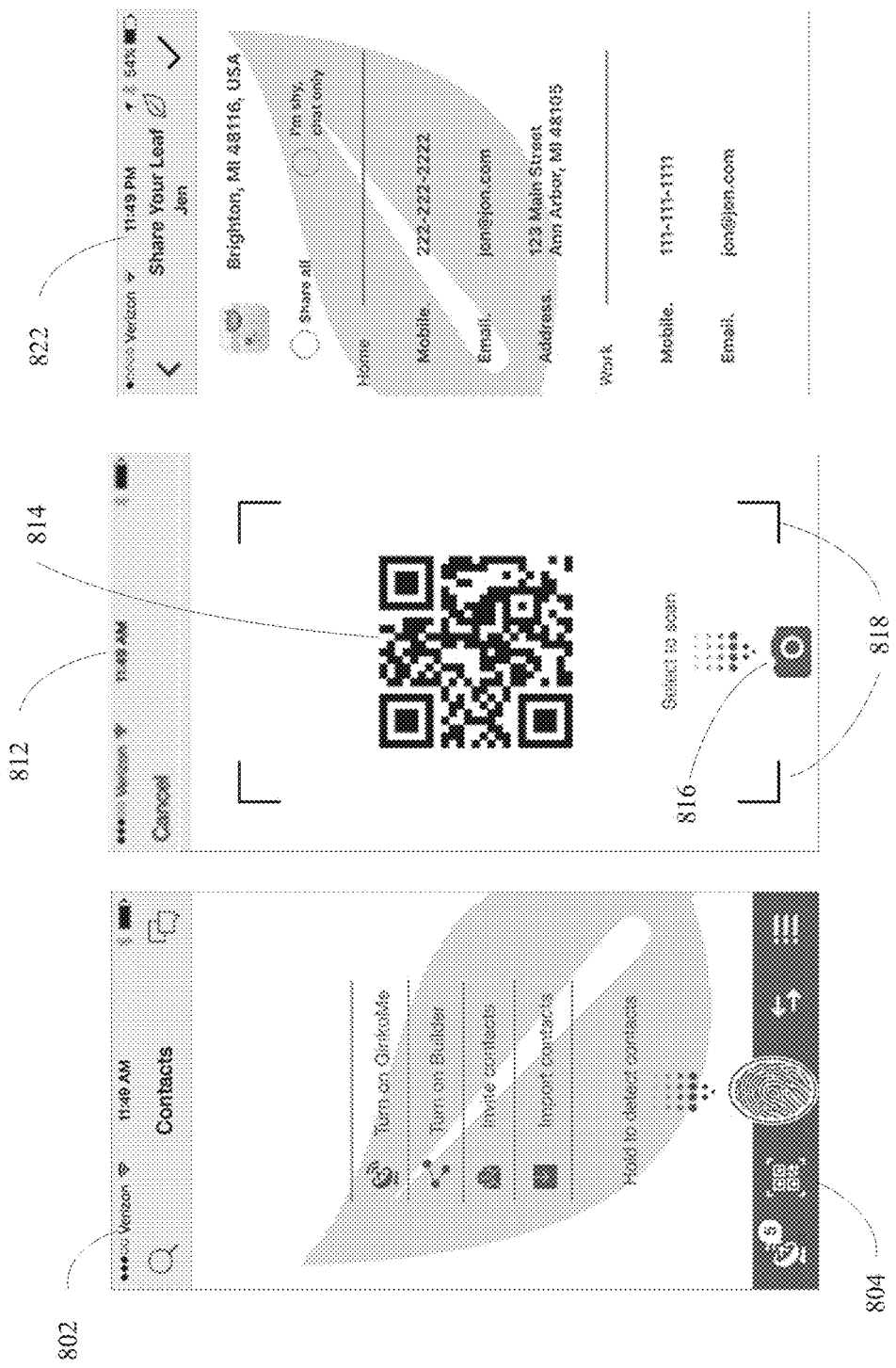
FIG. 8 is a diagram of an example of a user interface display for identifying a potential contact by scan code in accordance with implementations of this disclosure.

FIG. 8 is a diagram of an example of a user interface display for identifying a potential contact by scan code in accordance with implementations of this disclosure. In some embodiments, an application interface display 802 may display a contacts screen, including a scan icon 804 for permitting interfacing with another user device. For example, in response to a user input at icon 804, such as by a touch screen tapping, an application interface display 812 may be generated and a camera in user device 202 may be activated for capturing a scan code display of a user device associated with a potential contact. In some embodiments, in response to the camera of the user device 202 being aimed at a scan code, the application interface display may show the scan code 814 as captured by the camera, and may provide markers 818 as a view finder to assist the user in centering the scan code for the camera to focus. The camera icon 816 may be responsive to a user input, such as by a touch screen tapping or sliding, and may execute the scan of the scan code. An application interface display 822 may be generated in response to the scan execution, which displays the selectable user data screen from which the user may input whether to share all user data, share some user data, or chat only, in a manner as shown and described herein with respect to FIG. 6.

Figure 9:
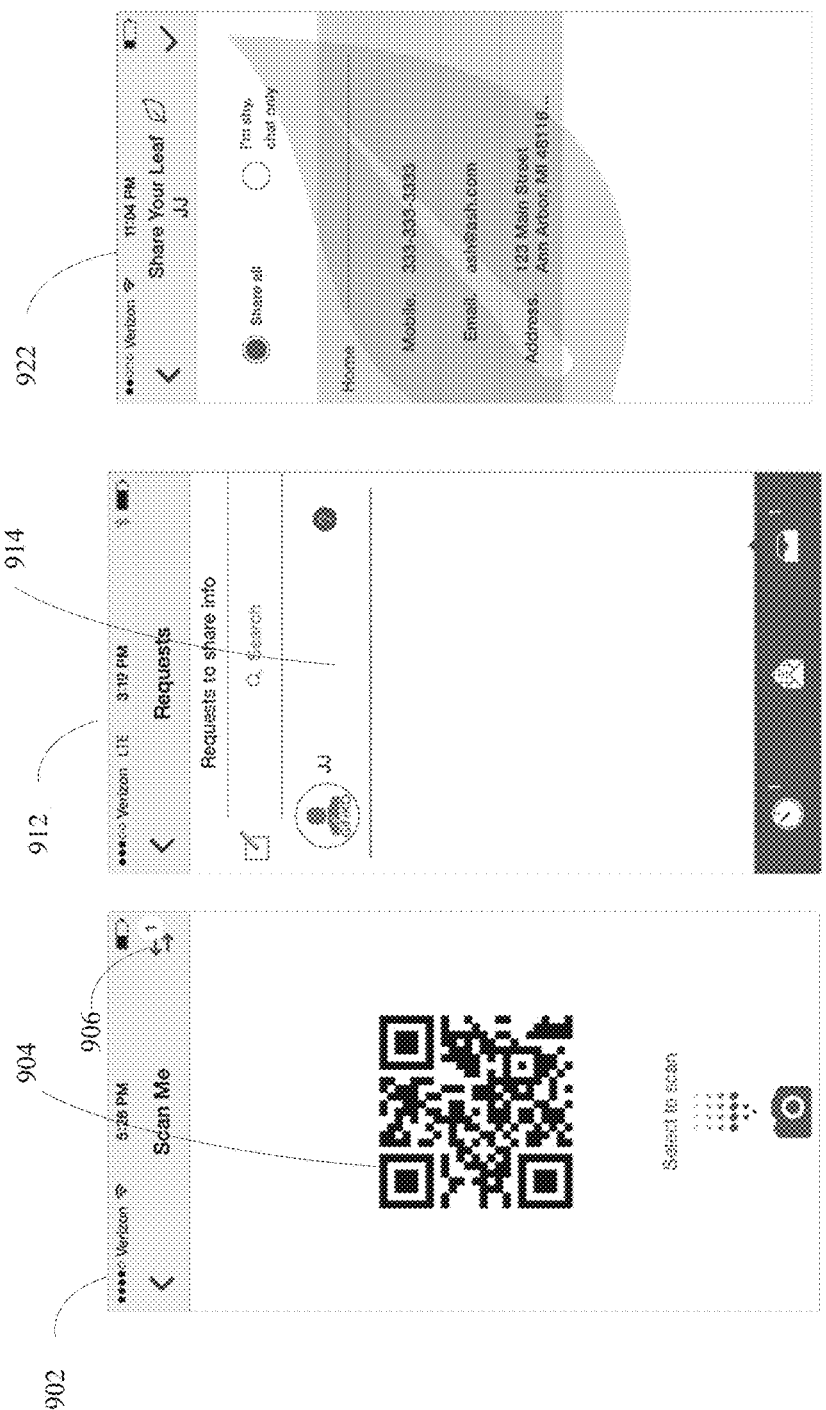
FIG. 9 is a diagram of an example of a user interface display for sharing user data by scan code in accordance with implementations of this disclosure.

FIG. 9 is a diagram of an example of a user interface display for sharing user data by scan code in accordance with implementations of this disclosure. In some embodiments, an application interface display 902 may display a scan code 904 so that another user device may read the scan code for identification as a potential contact. For example, the user device associated with scan code 904 of the display 902 may be presented to another user device that operates the scan code reader, such as the user device 202 that displays captured scan code 814 in FIG. 8, where the captured scan code 814 corresponds to displayed scan code 904. In some embodiments, in response to receiving a request for user data sharing from another user device, such as the user device of FIG. 8, the application interface 902 may display an indication of the received request at pending exchange icon 906, which may be responsive to user input. For example, in response to a user input at pending exchange icon 906, such as by a touch screen tapping, an application interface display 912 may be generated to display the potential contact identifier 914, which may be responsive to user input for accepting the request. In some embodiments, an application interface display 922 may be generated in response to the user input at identifier 914, to provide selectable user data for exchange to the requester. For example, the user may input at the application interface display 922 whether to share all user data, share some user data, or chat only, in a manner as shown and described herein with respect to FIG. 6.

Figure 10:
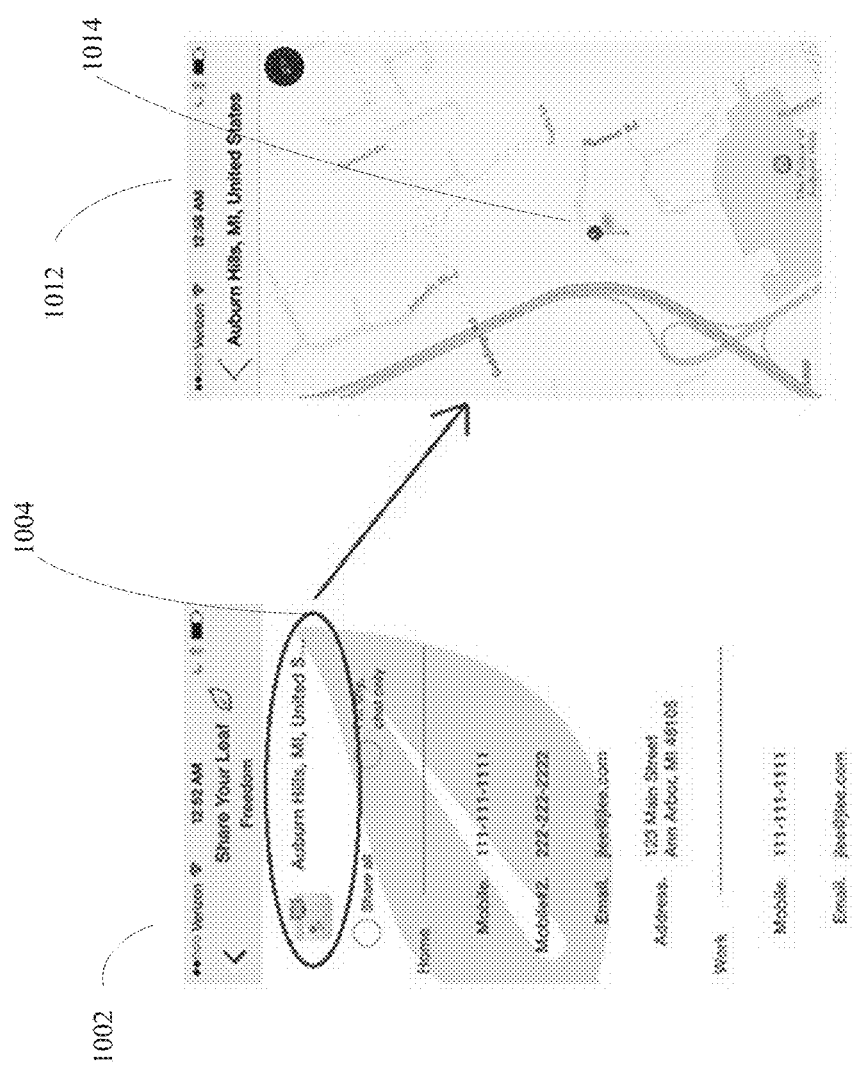
FIG. 10 is a diagram of an example of a user interface display for selecting location data for data sharing in accordance with implementations of this disclosure.

FIG. 10 is a diagram of an example of user interface display for selecting location data for data sharing in accordance with implementations of this disclosure. In some embodiments, an application interface display 1002 may display information related to the data sharing with a new contact and selectable by the user for constructing the contact profile information. For example, the application interface display 1002 may indicate the location information 1004 of the user device when the potential contact was detected and may associate the location information 1004 with the new contact registration as additional contact data. The application interface display 1002 may be responsive to user input, such as by tapping the location information 1004, and may generate an application interface display 1012 that shows a representation of the location information 1004 as a map location 1014. In some embodiments, the user interface unit 150 may be responsive to the user input for adding notes or comments within the new contact registration information as further contact data.

Figure 11:
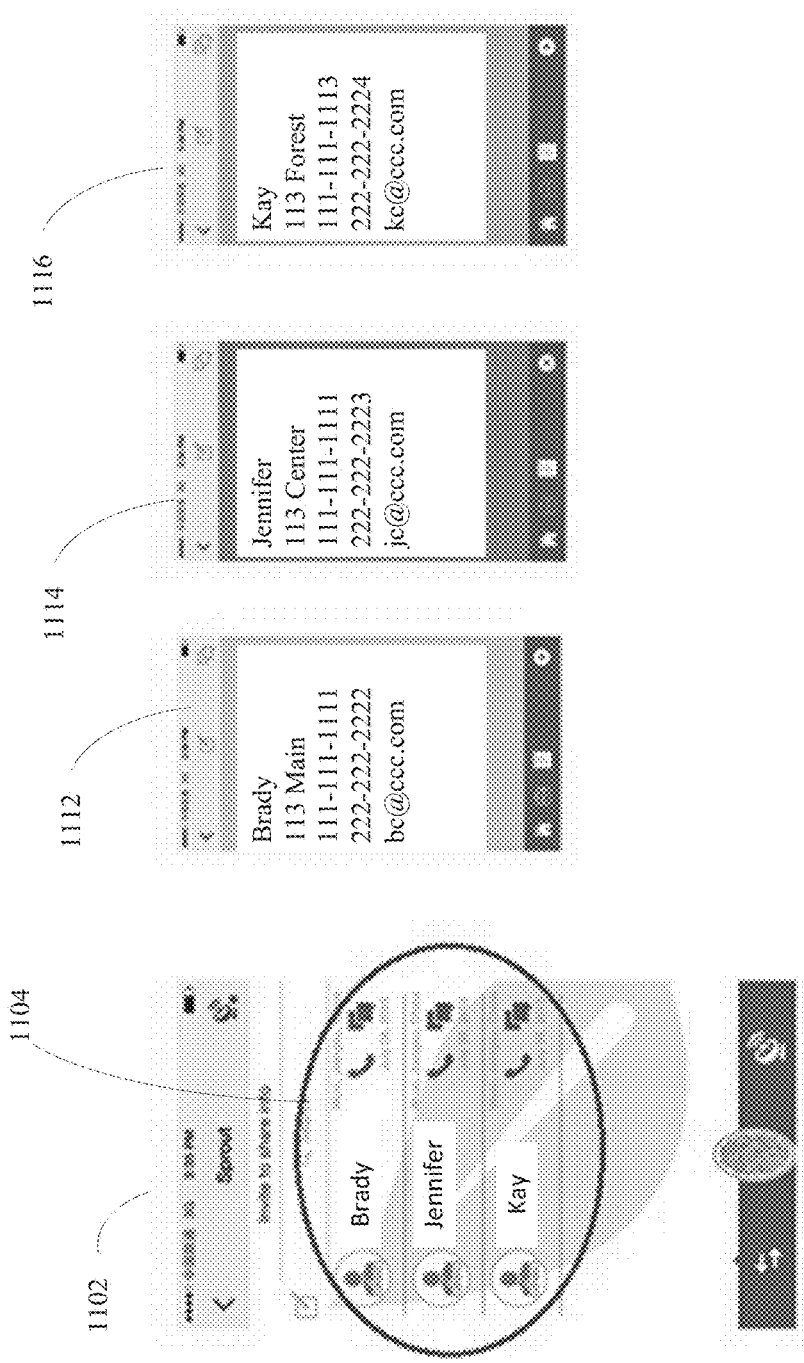
FIG. 11 is a diagram of an example of a user interface display of user data of listed registered contacts in accordance with implementations of this disclosure.

FIG. 11 is a diagram of an example of user interface display for user data of listed registered contacts in accordance with implementations of this disclosure. In some embodiments, an application interface display 1102 may identify registered contacts as a list in a display region 1104 responsive to user input, such as by tapping on a registered contact identification. For example, in response to tapping on registered contact identification in display region 1104, an associated application interface display 1112/1114/1116 may be generated and displayed on user interface unit 150. The application interface display 1112/1114/1116 may show contact data for a given registered contact to be viewed by the user as a contact profile, which may include aspects of the registered contact's account profile, such as the customizable features of profile background pictures and associated media. The viewable contact data for a given registered contact correlates to the permissions set by the registered contact such as any public user data and/or the private user data that the registered contact has agreed to share.

Figure 12:
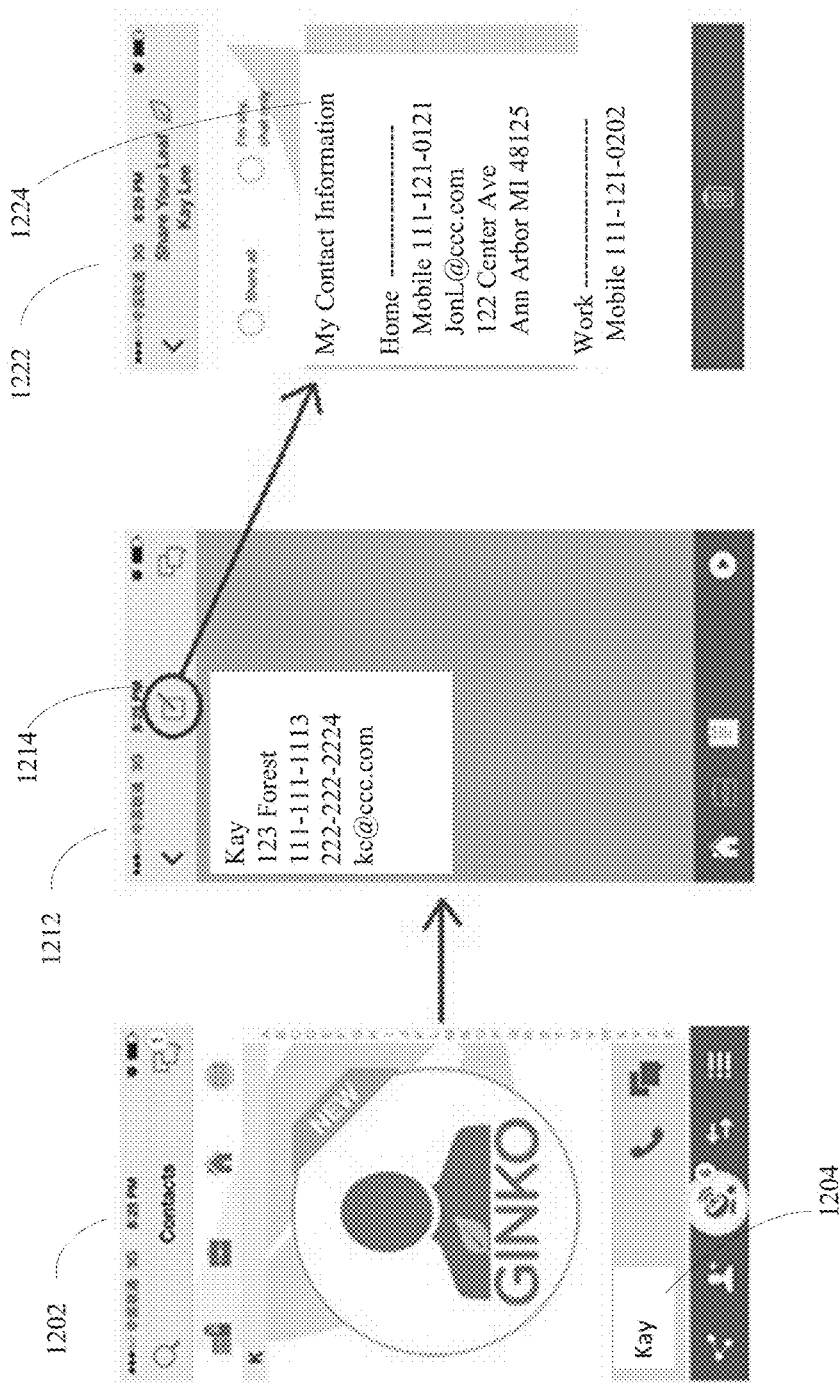
FIG. 12 is a diagram of an example of a user interface display for changing data sharing in accordance with implementations of this disclosure.

FIG. 12 is a diagram of an example of a user interface display for changing data sharing in accordance with implementations of this disclosure. As described herein, and notwithstanding the permissions originally set during an exchange of user data, in some embodiments, the user interface unit 150 may display configurable permission information set for various user data shared with a given registered contact. For example, the permission information may be displayed and may be responsive to user input for electing to share more or share less user data with registered contacts. In some embodiments, an application interface display 1202 may indicate a registered contact in display region 1204, which may be responsive to user input, such as by tapping the display region 1204. In response to the user input, an application interface display 1212 may be generated and displayed to include an editing icon 1214, which may be responsive to a user input. For example, an application interface display 1222 may be generated and displayed to show shared contact information 1224 previously defined for sharing with the registered contact. The shared contact information may be modified in response to user input on display 1222. For example, the user may select certain shared user data and remove it from the contact data registered with the registered contact, without altering the user account profile information, which may remain intact as user data for future data sharing. In some embodiments, the application interface display 1222 may modify shared user data by deleting an entire contact profile and removing all contact data relating to the registered contact in response to user input. In response to the modification to the contact profile by the user device of the user, the network server 232 may modify the user's contact registration to reflect the deletion, and in turn, may delete all contact data of the user within the registered contact's records.

Figure 13:
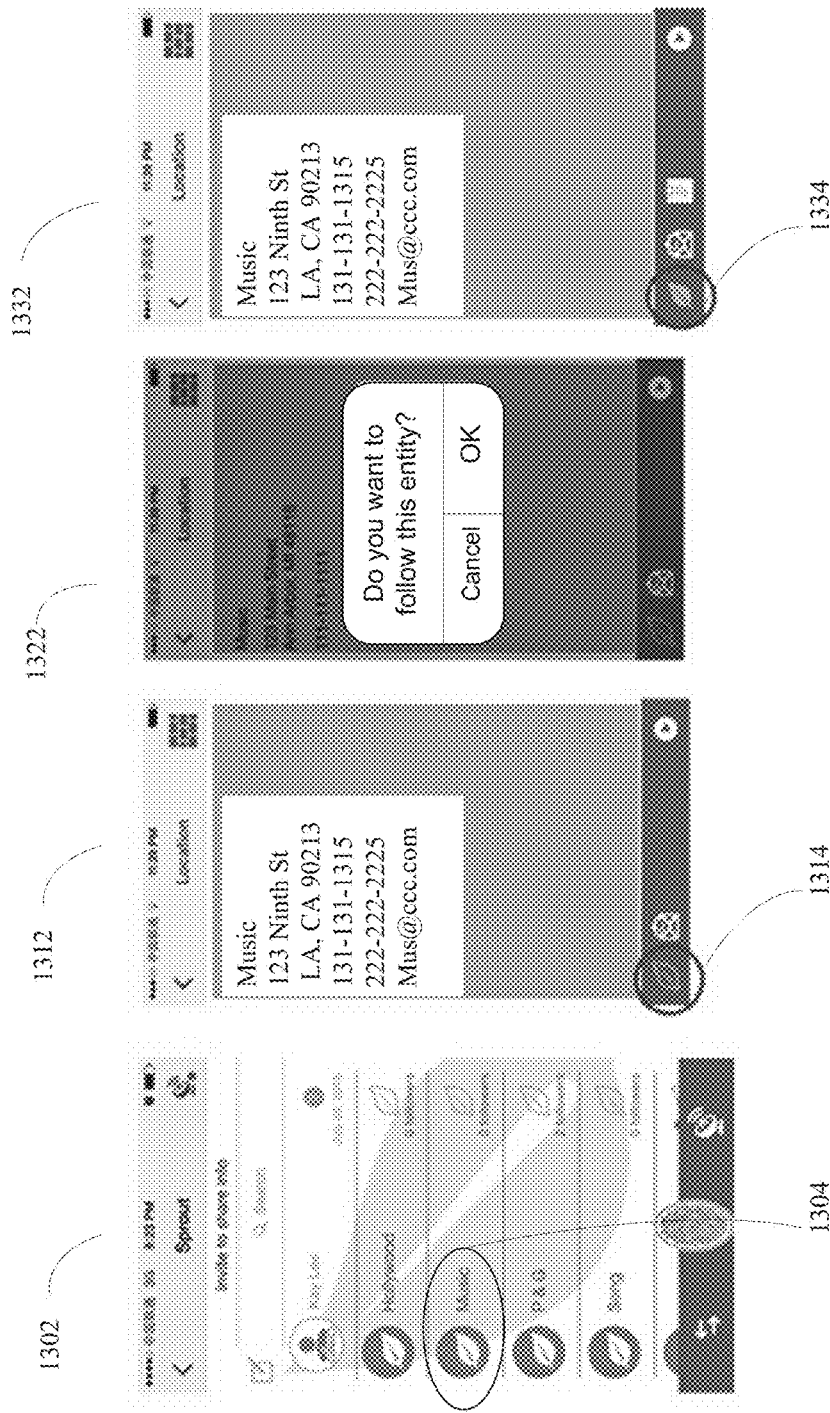
FIG. 13 is a diagram of an example of a user interface display for following registered users in accordance with implementations of this disclosure.

FIG. 13 is a diagram of an example of user interface display for following registered users in accordance with implementations of this disclosure. In some implementations, an application interface display 1302 may respond to user input for following one or more registered users. For example, a registered user identification appearing in display region 1304 may be responsive to user input, such as by tapping the identification on the display, for selection as an entity to be followed by the user. An application interface display 1312 may be generated and displayed in response to the user input, and may include follow icon 1314. In response to user input, such as by tapping the follow icon 1314, an application interface display 1322 may be generated and displayed with a prompt for the user to confirm that the user has selected to follow the entity. On a condition that the user confirms the selection, the application interface display 1332 may be generated and displayed for indicating that the user device will follow the selected entity. As a result of the user device following the selected entity, the network server 232 may send the entity's posts on the network to the user device, and the posts may be displayed on the user interface as a dedicated content feed viewable by the user.

Figure 14:
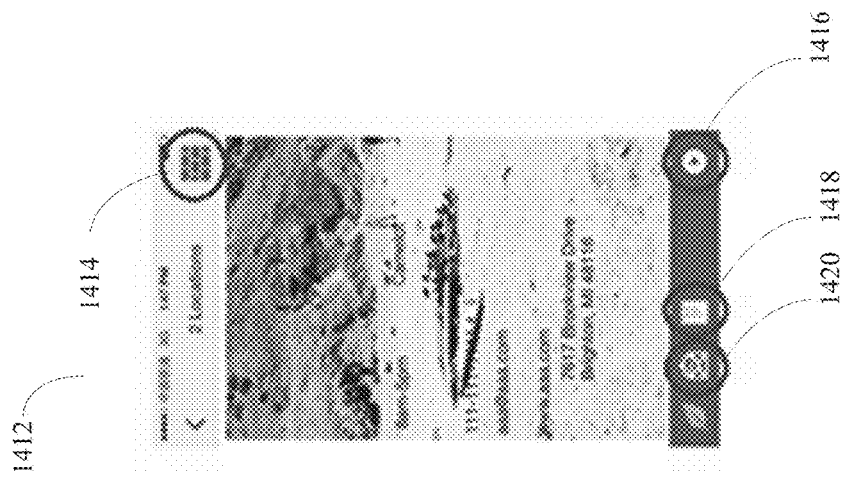
FIG. 14 is a diagram of an example of a user interface display for following registered contacts in accordance with implementations of this disclosure.
Figure 14:
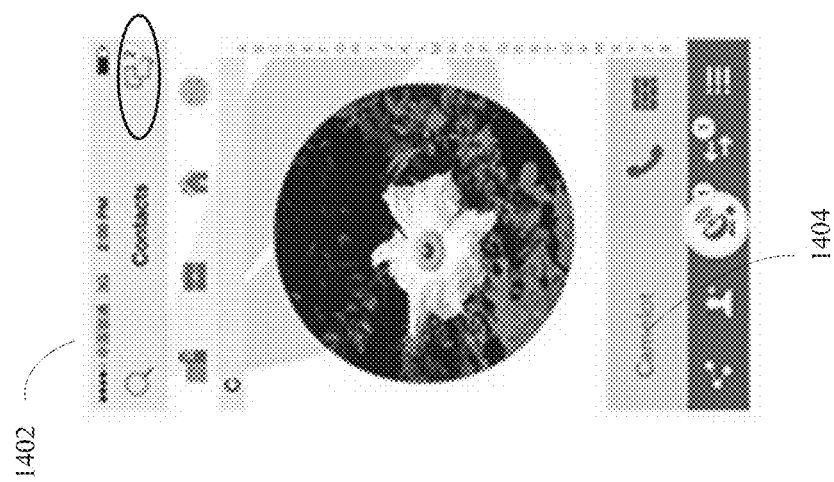

FIG. 14 is a diagram of an example of user interface display for following registered contacts in accordance with implementations of this disclosure. In some embodiments, an application interface display 1402 may show a list of followed contacts is display region 1404, which upon selection by the user, such as by tapping the followed contact identification, an application interface display 1412 may be generated and displayed to show the followed contact's content feed information. In some embodiments, the application interface display 1412 may provide options for the user to view information associated with the followed contact, which may include icons 1414/1416/1418/1420 responsive to user input. For example, the user may view the content feed associated with the followed contact by selecting the media icon 1414, or view media associated with the followed contact by selecting the media icon 1416, record notes or comments about the followed contact within the contact profile by selecting the clipboard icon 1418, or recommend the followed contact to other users by selecting the envelope icon 1420. In some embodiments, only contacts whose user data is set to public may be recommended to other users.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for data sharing between devices in a network, comprising:
    identifying user data associated with a user device of a user, the user data comprising at least one of a name, an address, a phone number, or an email address;
    determining a first current location of the user device;
    identifying, while a detection activation toggle is enabled at the user device, potential contact devices including a potential contact device of a potential contact that is associated with contact data,
        the identifying being based on a predefined detection preference and based on a second current location of the potential contact device being located within a proximity range relative to the second current location of the user device;
    receiving, from the user device, a request for the user to become a contact with the potential contact,
        the request comprising a first permission setting that is a permission setting,
        the permission setting being a first value or a second value that is set by a permitting user,
        the first value indicating that a subset of user data of the permitting user is to be shared with a permitted user,
        the second value indicating that none of the user data of the permitting user is to be shared with the permitted user and that only chats are allowed from the permitted user to the permitting user, and
        with respect to the first permission setting, the user being the permitting user and the potential contact being the permitted user;
    sending, based on the request, a communication to the potential contact device to initiate data exchange; and
    in response to receiving an acceptance of the communication, the acceptance including a second permission setting:
        setting the user as a contact of the potential contact,
            the subset of the user data being viewable to the potential contact in a case that the first permission setting being the first value; and
        setting the potential contact as a contact of the user,
            the contact data being viewable to the user in a case that the second permission setting being the first value.

2. The method of claim 1, wherein determining user device location includes receiving location information from the user device.

3. The method of claim 1, wherein identifying the potential contact comprises:
    identifying the proximity range based on receiving a proximity range setting associated with the user device; and
    comparing the proximity range to a calculated distance between the user device and each of a plurality of other devices near the user device.

4. The method of claim 1, wherein the contact data comprises at least one of a contact name, a contact business name, a contact availability status, a contact account picture, a contact phone number, a contact mobile number, a contact mailing address, a contact email address, a contact facsimile number, a contact birthdate, a contact social media link, a contact custom, or a contact website.

5. An apparatus for sharing user data with user devices registered in a network, comprising:

a memory;
a location component for determining a location of the apparatus;
a user interface comprising a touch screen responsive to user input from a user; and
a processor configured to execute instructions stored in the memory to:
  generate a first user interface display for displaying application functions on the user interface, and receiving user input of user data and user settings data, wherein the user data includes contact information and the user settings data includes a predefined detection preference and a proximity range setting based on a selected proximity relative to the apparatus;
  send the user data and user settings data to a network server;
  receive, from the network server and based on the predefined detection preference, potential contact information of respective potential contacts associated with the user devices located within the selected proximity;
  display the potential contact information on the user interface;
  send a request for the user to become a contact with a potential contact of the respective potential contacts, the request comprising a first permission setting that is a permission setting,
    the permission setting being a first value or a second value,
    the first value indicating that a subset of the user data is to be shared with the potential contact, and
    the second value indicating that none of the user data is to be shared with the potential contact and that only chats are allowed from the potential contact to the user; and
  in response to receiving an acceptance of the request, the acceptance including a second permission setting:
    set the user as a contact of the potential contact;
    set the potential contact as a contact of the user,
      the potential contact information of the potential contact becoming viewable to the user in a case that the second permission setting being the first value; and
    display the potential contact information of the potential contact.

6. The apparatus of claim 5, wherein the location component includes a global positioning system (GPS) function and the processor is configured to determine the location of the apparatus while the GPS function is enabled.

7. The apparatus of claim 5, wherein the processor is configured to enable the GPS function to determine the location of the user by:
  displaying an activation feature on the user interface; and
  receiving an activation input from the user interface.

8. The apparatus of claim 5, wherein the processor is configured to initiate a chat session with the potential contact by:
  displaying an activation feature on the user interface; and
  receiving an activation input from the user interface.

9. The apparatus of claim 5, wherein the processor is configured to initiate a user activated mode for potential contact detection by:
  generating a second user interface display including a detection activation function and a status indicator for the user activated mode; and
  sending a request to the network server to perform a single search for user devices to identify potential contacts in response to user interface with the detection activation function.

10. The apparatus of claim 5, wherein the processor is configured to initiate an automatic mode for potential contact detection by:
  generating a second user interface display including a detection activation toggle function and a status indicator for the automatic mode; and
  sending a request to the network server to search for user devices while the automatic mode is activated to identify potential contacts in response to user interface with the detection activation toggle function.

11. The apparatus of claim 10, wherein the detection activation toggle function is configured to toggle detection activation for one of: an unspecified period of time, a specified period of time, or a disablement of detection.

12. The apparatus of claim 10, wherein the detection activation toggle function is configured to toggle the GPS function for one of: an unspecified period of time, a specified period of time, or a disablement of detection.

13. The apparatus of claim 5, wherein the processor is configured to display the potential contact information on the user interface by:
  generating a second user interface display that identifies potential contacts on a map based on the potential contact information.

14. The apparatus of claim 13, wherein the processor is configured to:
  receive a selection of the potential contact from the user interface in response to a user input interfacing with the map.

15. The apparatus of claim 5, wherein the processor is configured to:
  receive, from the user interface, user settings data that includes a selection of which user data are to be shared with the potential contact.

16. The apparatus of claim 5, wherein the processor is configured to display the potential contact information on the user interface by:
  generating a second user interface display that identifies the potential contact in response to reading a scan code displayed on a user device of the potential contact.

17. A user device of a user, comprising:
a memory;
a communication component for communicating with a network server;
a user interface comprising a touch screen responsive to user input; and
a processor configured to execute instructions stored in the memory to:
  generate a user interface display for displaying application functions on the user interface, and receiving user input;
  receive, from the network server and based on a predefined detection preference, potential contact information of respective potential contacts associated with respective other user devices located within a selected proximity relative to the user device;
  display the potential contact information on the user interface;
  send a request for the user to become a contact with a potential contact of the respective potential contacts, the request comprising a first permission setting, the first permission setting being a first value or a second value, the first value indicating that a subset of user data is to be shared with the potential contact, and the second value indicating that none of the user data is to be shared with the potential contact and that only chats are allowed from the potential contact to the user; and in response to receiving an acceptance of the request, the acceptance including a second permission setting:

set the user as a contact of the potential contact, set the potential contact as a contact of the user, the potential contact information of the potential contact becoming viewable to the user in a case that the second permission setting permitting the user to view at least a subset of the potential contact information of the potential contact; and initiate a chat session with the potential contact.

18. The user device of claim 17, wherein the processor is further configured to:

receive user data of the potential contact from the network server in response to the request.

19. The user device of claim 18, wherein the memory stores contact information associated with a plurality of contacts, and the processor is further configured to:

classify the potential contact as a new contact;

create a contact profile for the new contact based on the received user data; and generate another user interface display that includes a map display having location markers associated with locations of respective contacts including a location of the new contact.

* * * * *